Nov. 23, 1971     R. W. COOLBAUGH ETAL     3,621,595
ELECTROLUMINESCENT LIGHT SOURCE AND
STRUCTURES ILLUMINATED THEREBY

Filed May 9, 1969     2 Sheets-Sheet 1

INVENTOR.
Richard W. Coolbaugh and
BY    Floyd W. Engels.

Christel & Bean
ATTORNEYS.

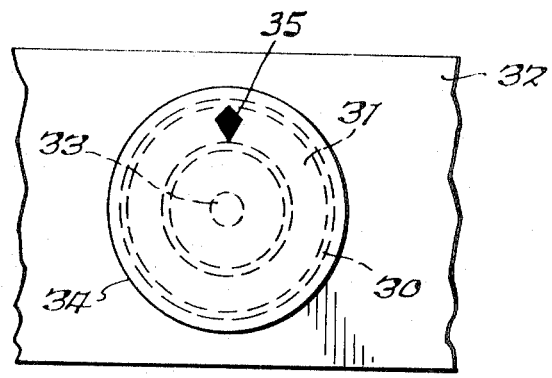
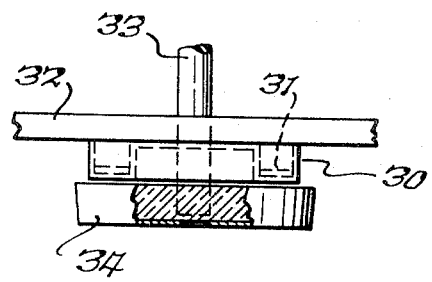
Fig. 5.     Fig. 5A.
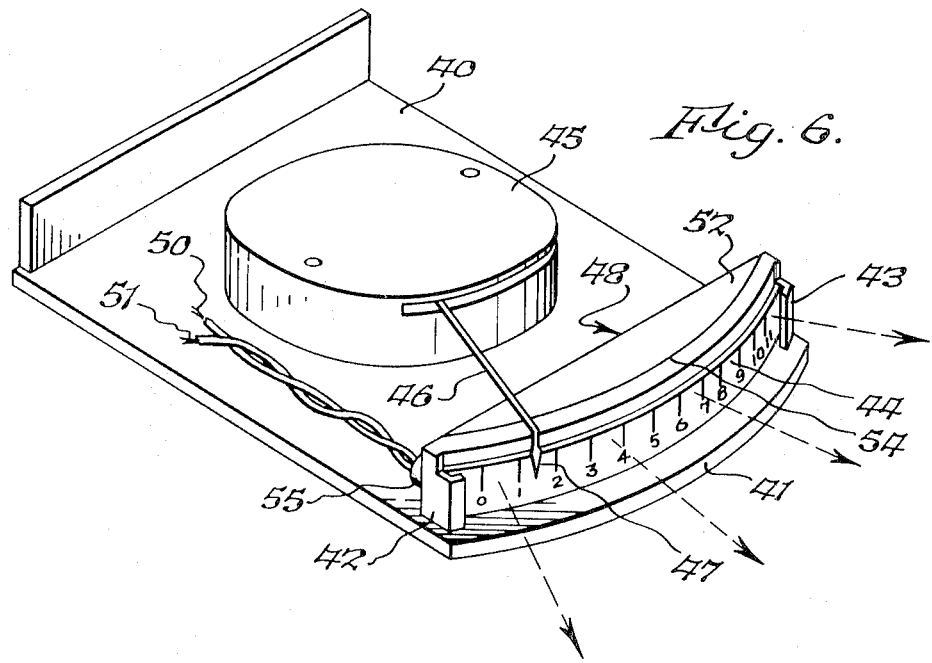
Fig. 6.
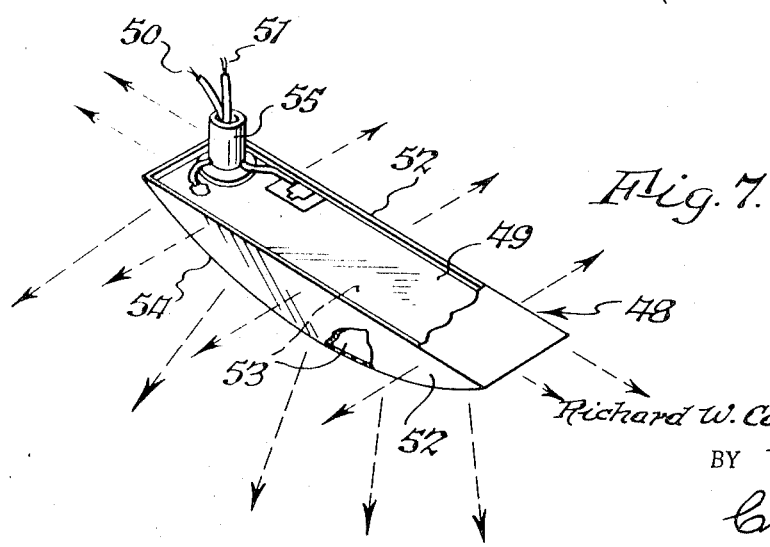
Fig. 7.
INVENTOR.
Richard W. Coolbaugh and
Floyd W. Engels
BY Christel & Bean
ATTORNEYS.

United States Patent Office 3,621,595
Patented Nov. 23, 1971

1

3,621,595
ELECTROLUMINESCENT LIGHT SOURCE AND
STRUCTURES ILLUMINATED THEREBY
Richard W. Coolbaugh, East Aurora, and Floyd W.
Engels, Colden, N.Y., assignors to A-T-O Inc., Cleveland, Ohio
Continuation-in-part of application Ser. No. 694,967, Jan.
2, 1968, now Patent No. 3,545,110. This application
May 9, 1969, Ser. No. 823,302
Int. Cl. G09f 13/22
U.S. Cl. 40—130 M                   12 Claims

ABSTRACT OF THE DISCLOSURE

A light source comprising an electroluminescent member encapsulated within a shell of light transmitting material and a separate indicia-bearing member of light transmitting material positioned adjacent the source so as to be illuminated thereby. The encapsulating medium is a transparent, light coupling potting compound having a high index of refraction. The source can serve as a mounting plate for the indicia-bearing member which is releasably attached thereto in an overlying manner. The source can be positioned within an instrument casing so that a light transmitting face of the shell is positioned directly behind the dial face, the shell face having a degree of curvature substantially equal to that of the dial face.

CROSS REFERENCE TO A RELATED APPLICATION

This is a continuation-in-part of our co-pending application entitled "Illuminated Panel and Method of Making the Same," Ser. No. 694,967, filed Jan. 2, 1968, now Pat. No. 3,545,110, and assigned to the assignee of the present invention.

BACKGROUND OF THE INVENTION

This invention relates generally to the illuminating art and, more particularly, to the illumination of instruments and control panels and the like.

The illumination of instruments and control panels such as are found in automobiles and aircraft poses a number of problems. The direction of one or more light sources onto the surface of the panel or instrument dial face is undesirable in that the reflected light can cause considerable eye strain over a period of time. The use of small incandescent lamps imbedded in a plastic panel and in alignment with the indicia thereon is limited to vehicles which do not experience the severe stresses and vibrations which can destroy the bulb filament and necessitate frequent bulb replacement, a complex task often requiring replacement of an entire panel section.

Electroluminescent sources have been proposed for panel illumination and, as described in our afore-mentioned co-pending application, they have been encapsulated within a shell of light transmitting material having an indicia bearing face to be illuminated, the encapsulating medium insuring the complete insulation of the electroluminescent member from surrounding electrically conductive materials. The integrity of such structures, while enhancing reliability and providing safety from electrical hazards, precludes an easy change in the indicia to be illuminated without disturbance to the electrical part of the panel assembly. Often a desired change in indicia will require replacement of the entire panel structure. Moreover, maximum legibility of angle of vision require that the electroluminescent member, when encapsulated, be in tight engagement with the shell inner surface. This, however, makes impractical the direct engraving of indicia onto the face of a display panel because of the possible damage to the electroluminescent member. In addition, an instrument having a planar or curved dial face illuminated by electroluminescent means, while highly desirable has heretofore been unavailable.

SUMMARY OF THE INVENTION

It is, therefore, an object of this invention to provide an illuminated structure including an encapsulated electroluminescent member to which structure indicia may readily be added or removed without damage or disturbance to the electroluminescent member.

It is a further object of this invention to provide an illuminated panel structure including an encapsulated electroluminescent member which may remain stationary while the indicia on the structure is changed.

It is a further object of this invention to provide illumination of an instrument dial face having any degree of curvature by an electroluminescent source included within the instrument casing.

This invention provides an illuminated structure including an electroluminescent member encapsulated within a shell by means of a light coupling compound and a separate indicia-bearing member positioned adjacent the shell so as to be illuminated thereby. The surface of the shell through which light provided by the electroluminescent member is transmitted may be of various shapes to conform with the shape of the particular member to be illuminated.

The foregoing and other objects, advantages and characterizing features of this invention will become apparent from the ensuing detailed description, reference being made to the accompanying drawings wherein like reference numerals denote like parts throughout the various views.

BRIEF DESCRIPTION OF THE DRAWINGS

FIG. 5 is a front elevational view of a modification of the embodiment of FIG. 1, and FIG. 5A is a top plan view thereof;

FIG. 6 is a perspective view of another embodiment of an illuminated structure provided by this invention; and FIG. 7 is a perspective view of a portion of the structure of FIG. 6 during an intermediate stage of construction.

DETAILED DESCRIPTION OF THE ILLUSTRATED EMBODIMENTS

Figure 1:
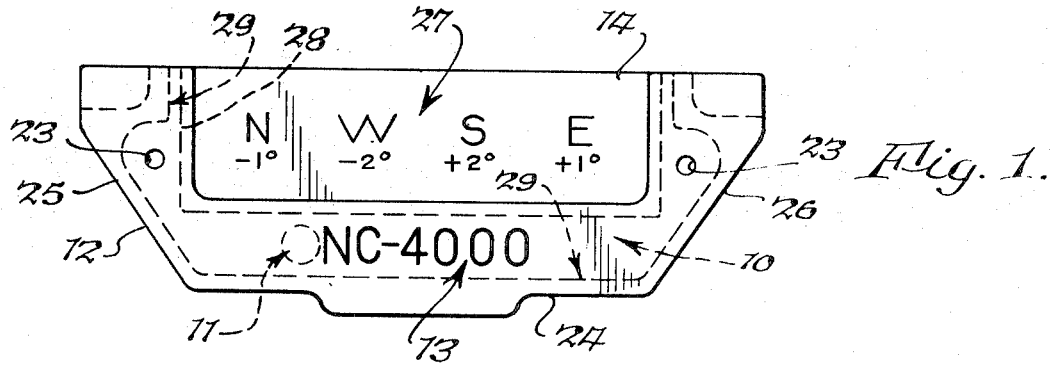
FIG. 1 is a front elevational view of one embodiment of an illuminated structure provided by this invention, as it would appear in use.

Referring now to FIG. 1 there is shown one embodiment of the illuminated structure of our invention as it would appear in an aircraft cockpit. The structure includes a shell member 10 of light transmitting material having encapsulated therein an electroluminescent member designated generally at 11 which shell member 10 may be attached to the aircraft instrument panel or other supporting structure. A separate member 12 of light transmitting material having indicia 13 thereon, in this particular illustration the aircraft registration number, is adapted to be snapped onto shell 10 in a partially overlying manner so as to be illuminated thereby. The shell 10 and member 12 fit together in a manner so as to provide a region into which a translucent placard 14 can be placed and be illuminated by shell 10. In this particular illustration the placard is provided with any desired legend, and is particularly suited for legends of a type which must be changed frequently.

Figure 2:
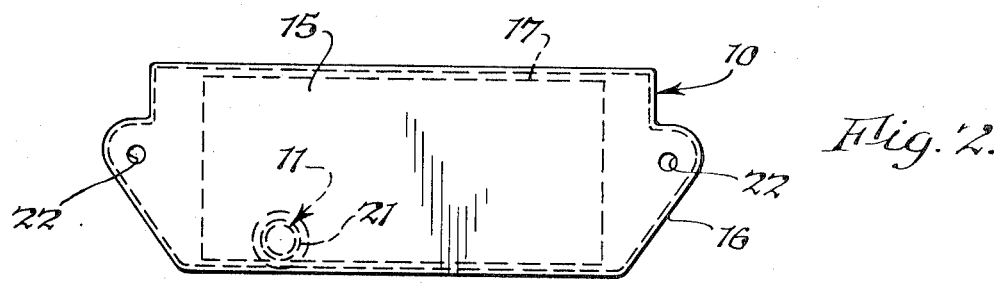
FIG. 2 is a front elevational view of the shell member of the structure of FIG. 1.
Figure 3:
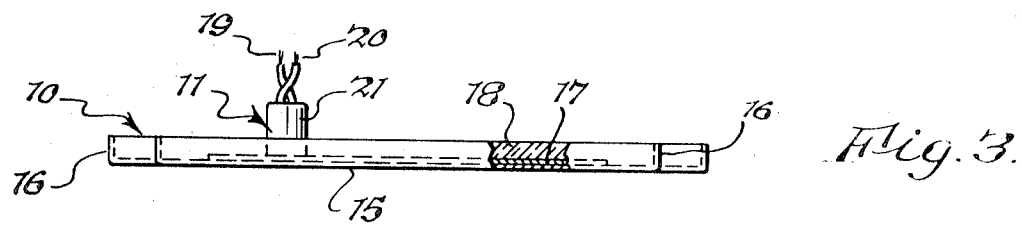
FIG. 3 is a top plan view, with a portion of the external surface removed, of the shell member of FIG. 2.

FIGS. 2 and 3 show the front and top, respectively, of shell 10 which in this particular illustration is generally rectangular in shape. The shell has a face portion 15, the configuration shown in FIG. 2 being merely illustrative of many possible varieties, and is formed from a suitable thermo-plastic light-transmitting material such as for example a cellulose acetate, styrene or polyvinyl resin. The shell is vacuum formed by means of a master die plate having a peripheral dimension defining a peripheral flange or skirt portion 16 of the shell 10 and a face defining the face portion 15. As described in our co-pending application a sheet of the plastic material is heated to a state of plasticity and vacuum formed over the master die plate to the configuration shown in FIGS. 2 and 3 in a manner readily understood by those skilled in that art.

The shell 10 is then removed from the die and inverted on a plate, table or other supporting surface. An electroluminescent member 11 of conventional, commercially available form, for this particular illustration including a plate-like portion 17, is then placed within the shell 10. The member 11 itself comprises no part of this invention, and being a commercially available product well understood by those skilled in the art a detailed description is deemed unnecessary. Suffice it to say that electroluminescent member 11 is available in various plate forms and can be constructed in other configurations. The plate portion 17 of the electroluminescent member 11 is preferably positioned adjacent the face 15 of shell 10 as shown more clearly in FIG. 3.

The shell 10 is then filled to a level, preferably approaching or at the level of the peripheral flange 16, encapsulating the electroluminescent member 11 with a light coupling, transparent potting compound. The compound should be suitably transparent, have a high index of refraction, be free of bubbles and solids, withstand extreme and sudden temperature changes, be self-extinguishing and also be vibration insensitive. A transparent epoxy resin was found to satisfy these requirements. By filling the interior of the shell with potting compound 18 the plate 17 of the electroluminescent member and the connections to electrical leads 19, 20 thereof are completely incapsulated and, hence, insulated and reinforced thereby. A dielectric sleeve 21 surrounds the leads 19, 20 and is imbedded in the potting compound 18 at one end thereof and is filled with resiliently yieldable, insulating material, such as an RTV silicone resin, to provide strain relief and protection for the electrical leads from damage due to vibration.

By virtue of this arrangement, the electroluminescent member 11, shell 10 and potting compound 18 are united to provide a monolithic light source of substantial structural integrity. Moreover the light coupling, transparent potting compound causes the surface of shell 10 to be totally lighted when the electroluminescent member is energized. Electrical energization by a 120-volt A.C. source at 400 Hz. is suitable. The shell 10 can be readily mounted to a supporting structure, such as an aircraft instrument panel, by means of screws or bolts extending through apertures 22, provided at both ends of the shell or through an adhesive applied to the back face of shell 10. When, as in this particular illustration, the shell is a relatively thin rectangle, it may serve as a rigid mounting plate for a snap-on, overlying indicia bearing member.

Figure 4:
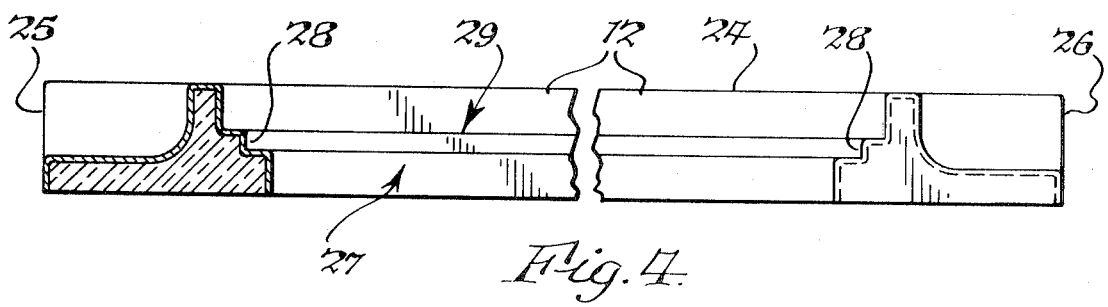
FIG. 4 is a top plan view, with a portion of the external surface removed, of the non-illuminated or, indicia-bearing member of the structure of FIG. 1 and shown in enlarged form.

One example of many such indicia-bearing members adapted to be releasably attached to shell 10 is the member designated 12 in FIG. 1, a top view of which is shown in FIG. 4. The member 12 may be formed from any suitable light transmitting material, for example vinyl, or alternatively could comprise a shell filled with transparent light coupling potting compound and thus be structurally similar to shell 10 with the difference of not including the electroluminescent member. In this particular illustration the member 12 as shown in FIG. 1 has a base portion 24 and first and second flange portions 25, 26 which define therebetween a region 27 having a length slightly less than that of shell 10. On one face of the member 12 indicia 13 may be engraved, as is the aircraft registration number in this particular illustration, or provided by well-known silk screening techniques or by any other desired techniques. Because of the particular configuration of member 12, intended by way of illustration only, the indicia 13 are conveniently provided on the base portion 24 but the particular location of the indicia on member 12 is purely a matter of choice and convenience and dependent also on the particular configuration selected for member 12.

Member 12 is formed to provide a generally U-shaped shoulder 28 around the periphery of region 27 and behind the indicia-bearing face of the member. Portions of the base 24 and flanges 25, 26 of the member 12 are removed so as to provide a recess 29 open to the back or non-indicia-bearing face of member 12 which recess has a configuration identical with the peripheral configuration of shell 10 so as to facilitate a firm but releasable attachment of member 12 to shell 10. When the two members are so assembled and when the electroluminescent member 11 is energized, the indicia 13 provided on the face of member 12 will be back-lighted. A second indicia-bearing member, in the form of a translucent placard designated 14 in FIG. 1, may be inserted into the slot thus provided at 28 so as to be supported by the shell 10 and member 12 and be backlighted by the electroluminescent source 11 which totally illuminates shell 10.

While in preferred form the illuminated structure of this invention includes an encapsulated electroluminescent member which serves as a light source and mounting plate for a releasably attached, overlying indicia-bearing member, it is to be understood that the invention in its broader aspects is intended to include an encapsulated electroluminescent member serving as a light source for a separate indicia-bearing member of light transmitting material positioned adjacent the source so as to be illuminated thereby but not necessarily attached thereto. For example, as shown in FIG. 5, an annular shell 30 of light transmitting material of generally U-shape in transverse section has a disc-shaped electroluminescent member 31 positioned therein and encapsulated therein by means of the afore-mentioned light coupling compound and can be mounted in a convenient manner to an instrument panel 32 or other supporting structure. A shaft 33 rotatably mounted in the panel 32 at a location concentric with respect to shell 30 could have affixed to the end thereof an indicia bearing member in the form of knob 34. The knob would be made of light transmitting material and in this particular illustration is externally opaque except for a small pointer or dial portion 35. The knob is of sufficient diameter so as to overlie the shell 30 and by virtue of this arrangement the dial portion 35 is conveniently illuminated by the electroluminescent member 31.

An important advantage of the electroluminescent light source and illuminated structures herein described is the structural integrity, by virtue of encapsulation of the electroluminescent member, combined with the ease in changing the illuminated indicia. Encapsulation provides electrical isolation and non-resonance of electrical connections at the interface of the electroluminescent member otherwise caused by vibrations. From the example of the encapsulated electroluminescent member serving as a mounting plate for the removable indicia bearing member it is readily apparent that the indicia may be changed easily and without disturbing the electrical part of the panel assembly. In addition, the indicia bearing member may be engraved if desired without any damage to the electroluminescent member which is encapsulated in the separate mounting plate. The particular illustration wherein a translucent, indicia bearing placard is supported between the mounting plate and indicia bearing member is one example of how the degree of flexibility in changing indicia may be increased.

FIG. 6 reveals another embodiment of an illuminated structure provided by this invention, in particular, an instrument having a dial face illuminated by an electroluminescent light source. A portion of a typical instrument casing is shown and includes a base 40 curved at one end 41 and provided at the corresponding corners with upright and notched supporting members 42, 43 each adapted to receive and hold a corresponding end of a curved dial face 44 of translucent material provided with indicia on the outer surface and adapted to be back-lighted. This particular illustration includes a curved convex dial face, often employed to avoid parallax, but this invention can be used readily with different shaped dial faces, for example planar or concave. An instrument movement or mechanism 45 is mounted to the base of the casing and an indicator arm 46 is drivenly connected to the instrument movement at one end and extends substantially parallel to the base and slightly beyond the dial face 44 where it terminates in a right angle bend into a pointer 47. The pointer 47 will be moved back and forth across the dial face 44 by the mechanism 45 in response to variations in a measured quantity as is well known.

In accordance with this invention the dial face is illuminated, in particular back lighted, by an electroluminescent light source 48 positioned behind the dial face 44 and within the instrument casing. The light source, which will be described further in more detail, briefly includes a planar electroluminescent member 49 energized through electrical leads 50, 51 and encapsulated in a shell 52 by means of a transparent, light coupling compound 53. The member 49 is desirably planar because bending it to conform to the curvature of the dial face can create undesirable surface stresses and strains. Shell 52 is provided with a face 54 opposite the electroluminescent member 49 and having a degree of curvature preferably identical with that of the instrument dial face 44 whereby face 54 conforms to face 44. The source 48 is positioned so that face 54 of the shell 52 is close behind, preferably in contact with, the instrument dial face, and the light coupling compound 53 having a high index of refraction, transmits the light emitted from the member 49 outward at angles from 0 to 90 degrees normal to the planar surface of member 49 so that face 54 of the shell and, hence, the instrument dial face is totally lighted.

The source 48 is shown in more detail in FIG. 7. The shell 52 is formed from suitable light-transmitting thermoplastic material by conventional vacuum forming techniques similar to shell 10 of the embodiment of FIGS. 1–4. While the shell 52 is in the form of a hollow plano-convex prism, it may be made in other geometric forms such as rectangular prisms, and cylinders to mention a few. The transparent, light-coupling potting compound 53 is desirably an epoxy resin similar to the afore-mentioned compound 18 and having the same characteristics, particularly a high index of refraction. The planar electroluminescent member 49 is encapsulated within the shell 52 by the potting compound 53 with the electrical leads 50, 51 connected thereto in a manner similar to that described in our afore-mentioned co-pending application. A dielectric sleeve 55 surrounding the leads 50, 51 is embedded at one end in the potting compound 53 and is filled with resiliently yieldable, insulating material, such as an RTV silicone resin to provide strain relief.

The illuminated instrument assembly herein described is readily adaptable to multicolor lighting. The instrument dial face could include different colored portions corresponding, for example, to maximum or minimum ranges or to several bands or ranges of operation. Alternatively, several electroluminescent members each capable of emitting a different colored light can be encapsulated in the shell to provide the different signals. It is known that the particular composition of the electroluminescent phosphor will determine the color of light emitted and, for example, a member emitting green light might be used to indicate safe operating conditions and one emitting red light used to indicate dangerous operating conditions.

Although the instrument described has a single indicator movement or mechanism, two indicators could be mounted back-to-back on a common base with a single dial face and an encapsulated electroluminescent light source positioned between the two pointers of the separate movements. The single scale with a right and left hand indicator being seen clearly against the back-lighted dial face could, for example, provide an indication of the operation of port and starboard engines in an aircraft. Moreover, separate red and green electroluminescent members could be used for illuminating the port and starboard indicators, respectively.

The encapsulated electroluminescent light source located within the instrument casing combines the aforementioned advantages associated with the structural integrity provided by such encapsulation with the total illumination of an instrument dial face having any desired degree of curvature. Encapsulation insures complete electrical insulation of the electroluminescent member from the instrument electrical components. The light coupling potting compound provides total illumination of a curved dial face by a planar electroluminescent member. In addition the dial face, being structurally independent of the light source, can be readily changed.

While selected embodiments of the invention have been described with specificity this is intended to be by way of illustration, not limitation.

We claim:

1. In combination with a moving indicator electrical instrument or gauge having a light transmitting dial face at one end of the casing thereof: an electroluminescent light source positioned within said casing adjacent said dial face, said electroluminescent light source comprising:
   (a) a shell having a face of light transmitting material positioned adjacent said instrument dial face;
   (b) an electroluminescent member positioned within said shell; and
   (c) a light transmitting potting compound filling said shell to a level encapsulating said member.

2. The combination recited in claim 1 further including means for electrically energizing said electroluminescent member.

3. The combination recited in claim 1 wherein said potting compound is a transparent resin.

4. The combination recited in claim 1 wherein said dial face is curved and said adjacent light-transmitting shell face is curved to conform with said dial face.

5. In combination:
   (a) a light source comprising a shell having a face of light transmitting material, an electroluminescent member positioned within said shell, and a light transmitting potting compound filling said shell to a level encapsulating said member; and
   (b) an indicia-bearing member of light-transmitting material positioned adjacent said shell face so as to be illuminated thereby.

6. The combination recited in claim 1 wherein said potting compound is a transparent resin.

7. The combination recited in claim 1 wherein said source is adapted to be mounted to a support and said indicia-bearing member is adapted to be releasably attached to said source.

8. The combination recited in claim 7 wherein said shell has a given peripheral configuration and said indicia bearing member is provided on one surface thereof with a recess having a configuration mating with the peripheral configuration of said shell whereby said member can be mounted firmly but releasably on said shell.

9. The combination recited in claim 8 wherein said indicia-bearing member is provided with a cut-out region in a portion thereof whereby said shell and said indicia-bearing member when mounted together support a second indicia-bearing member.

10. The combination recited in claim 9 wherein said cut-out region is provided with a peripheral slot adapted to slidably receive said second indicia-bearing member.

11. The combination recited in claim 1 wherein said shell is adapted to be mounted to a support and said indicia-bearing member is connected to said support.

12. The combination recited in claim 11 wherein said shell and said electroluminescent member are both annular in shape, said shell being mounted to a supporting member, a shaft connected to said supporting member and concentric with respect to said annular shell, and an indicia bearing member affixed to the end of said shaft and overlying said shell.

References Cited

UNITED STATES PATENTS

| | | | |
|---|---|---|---|
| 2,787,652 | 4/1957 | Kelsay | 264—272 X |
| 3,003,305 | 10/1961 | Goldman | 40—130 M |
| 3,037,137 | 5/1962 | Motson | 40—130 X M |
| 3,065,369 | 11/1962 | Motson | 40—130 M UX |
| 3,284,941 | 11/1966 | Kaup | 313—108 X A |

ROBERT W. MICHELL, Primary Examiner

R. CARTER, Assistant Examiner